United States Patent [19]

Anderson

[11] Patent Number: 4,583,599
[45] Date of Patent: Apr. 22, 1986

[54] GROUND WORKING SWEEP

[76] Inventor: Gerald J. Anderson, Box 1317, Melville, Saskatchewan, Canada, S0A 2P0

[21] Appl. No.: 653,594

[22] Filed: Sep. 24, 1984

[30] Foreign Application Priority Data

Sep. 27, 1983 [CA] Canada .................................. 437696

[51] Int. Cl.$^4$ ............................................. A01B 23/02
[52] U.S. Cl. .................................... 172/730; 172/771
[58] Field of Search .............. 172/730, 720, 724, 722, 172/733, 745, 769, 770, 726, 771

[56] References Cited

U.S. PATENT DOCUMENTS

| | | | |
|---|---|---|---|
| 589,025 | 8/1897 | Purnell | 172/730 X |
| 1,648,843 | 11/1927 | Francis | 172/730 |
| 2,323,412 | 7/1943 | Noble | 172/720 |
| 2,595,353 | 5/1952 | Graham | 172/730 |

FOREIGN PATENT DOCUMENTS 555 of 1926 Australia .............................. 172/730

Primary Examiner—Richard J. Johnson
Attorney, Agent, or Firm—Stanley G. Ade

[57] ABSTRACT

A ground working sweep comprises a flange for supporting the sweep body and provides two cutting edges lying in a horizontal plane extending rearwardly and outwardly from a central point at the front of the sweep. The point lies forwardly and below the flange and the point and edges lie in a horizontal plane. In comparison with the conventional sweep, a pair of wings are added at the rear ends of the cutting edges so as to provide an additional cutting edge having a sharp change of direction relative to the outward direction of the first cutting edge. The outermost point of the cutting edge lies on an edge extending rearwardly from the cutting edge. The change in direction in the cutting edge acts to cut weeds running back along the cutting edge and the wings reduce the tendency of wear to decrease the working width of the sweep.

3 Claims, 4 Drawing Figures

U.S. Patent  Apr. 22, 1986  4,583,599
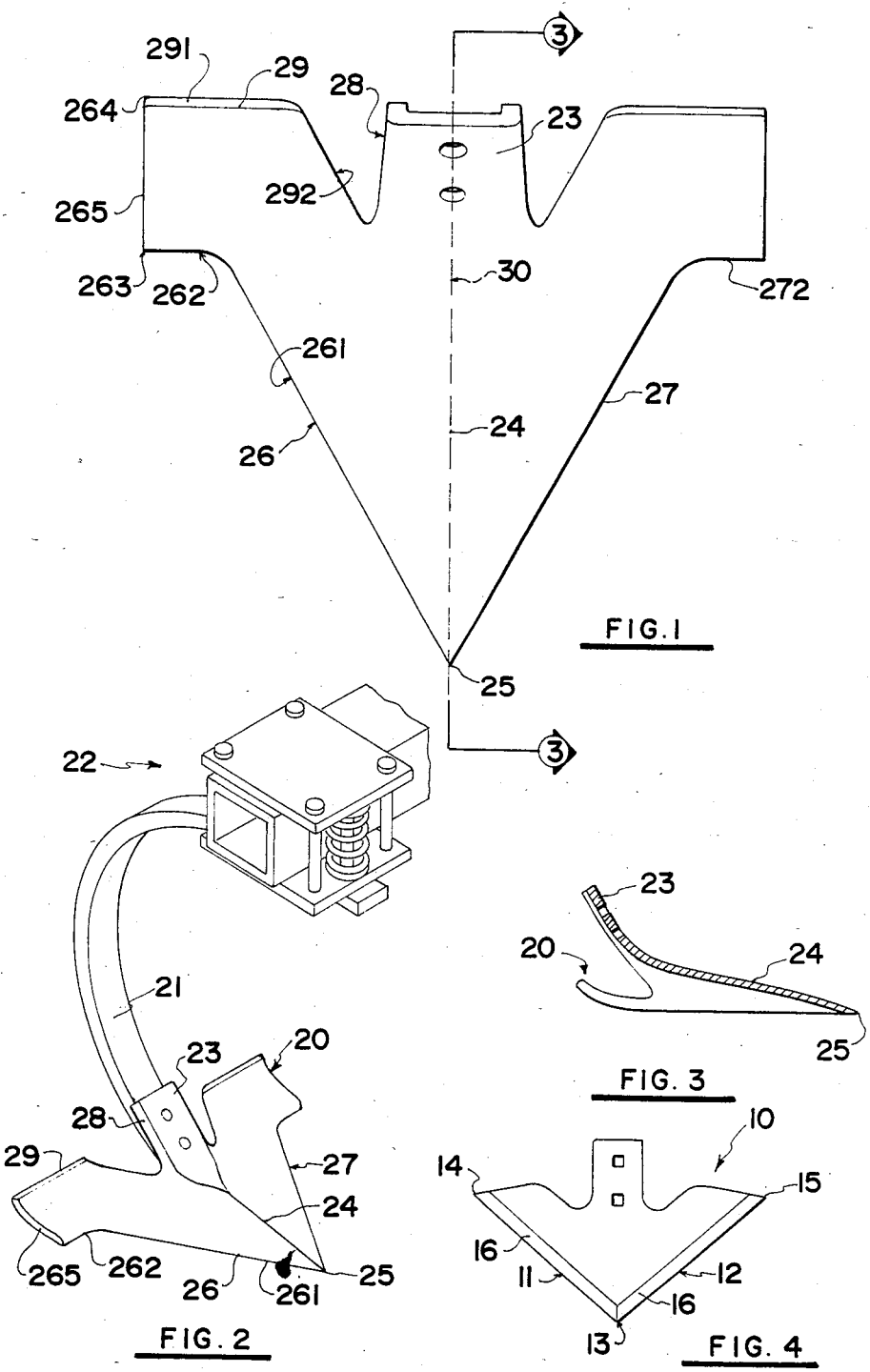

4,583,599

1

GROUND WORKING SWEEP

BACKGROUND OF THE INVENTION

This invention relates to ground working sweeps of the type which can be attached to a cultivator or deep tillage apparatus for working the ground. Conventional sweeps are well known and widely used and comprise an arrow-shaped head with a flange centrally of the sweep inclined upwardly and rearwardly for attachment to the conventional tine. The edges of the sweep lie in a generally horizontal plane when the sweep is positioned for use and are inclined rearwardly and sidewardly from a central point so as to cut through the ground beneath the surface. The edges of the sweep are generally sharpened so as to provide cutting edges which reduce the power required to draw the sweep through the ground.

Careful observations and study by the present inventor have revealed that firstly the sweeps tend to wear at the rearmost corner of the cutting edge as the earth brushes past the rearmost corner, thus gradually reducing the working width of the sweep. Furthermore and more importantly, the sweep tends to be ineffective in that it merely tends to push aside weeds under the soil surface rather than to cut the weeds as intended.

SUMMARY OF THE INVENTION

It is one object of the present invention therefore to provide an improved sweep which can be manufactured simply and cheaply similar to the construction of the present or conventional sweep and yet provides a modified shape which improves performance.

Accordingly the invention provides a ground working sweep comprising a metal body having a means for attachment of the body to a support tine whereby the sweep can be drawn through the earth, a cutting edge of the sweep projected forwardly from the tine for engaging the earth as the sweep is moved through the earth, the cutting edge having a forwardmost central point and two side edges which extend from the point and each of which includes a first substantially straight portion inclined sidewardly and rearwardly away from the point relative to a longitudinal axis central to the sweep and a second substantially straight portion contiguous with the first and substantially at right angles to the longitudinal axis.

As with the conventional sweeps, the cutting edges preferably lie in a horizontal plane so that the edge cuts through the soil beneath the surface.

Thus the cutting edges provide a pair of wings which extend outwardly from the sides of the sweep to ensure that weeds contacted by the sweep are cut by the outwardly extending wings rather than merely brushing past the outside edges of the sweep. In addition the outwardly extending surfaces reduce the tendency of wear of the edges to reduce the working width of the sweep, thus providing a sweep which will last for increased number of working hours.

With the foregong in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a plan view of a ground working sweep according to the invention.

FIG. 2 is an isometric view showing the sweep of FIG. 1 attached to a support tine and trip mechanism of a cultivator.

FIG. 3 is a cross sectional view along the lines 3—3 of FIG. 1.

FIG. 4 is a plan view of a conventional cultivator sweep.

In the drawings like characters of reference indicate corresponding parts in the different figures.

DETAILED DESCRIPTION

Turning firstly to FIG. 4 there is shown a conventional cultivator sweep of the type which is widely used in the industry. The shape of the sweep has become almost universally accepted and any differences between competing models are hardly discernible. As shown the shape is substantially in the frm of an arrow with two side edges 11 and 12 of the sweep 10 leading from a point 13. The edges 11 and 12 and the point 13 thus form the ground working surfaces and are sharpened at 16 to assist in working the soil and in cutting subsurface weed structures.

Turning now to the present invention which is illustrated in FIGS. 1 and 2, the sweep is illustrated at 20 attached to a tine 21 which is supported on a trip mechanism 22 of conventional form. The tine is substantially rigid so as to hold the sweep in constant position beneath the surface of the soil except when tripped by contact with a stone or other solid object.

The sweep itself is formed of a unitary integral body and includes a flange 23 which is inclined upwardly and rearwardly relative to the cutting edges of the sweep for engagement with the downwardly depending shank 21.

From the flange 23, the central upper surface of the sweep curves downwardly as at 24 toward a point 25 at the forwardmost position of the sweep. The point 25 also comprises the lowermost position on the sweep with the cutting edges indicated at 26 and 27 extending rearwardly and sidewardly from the point and lying in substantially the same horizontal plane so that the cutting edges on the point cut through the soil in a continuous horizontal plane.

The side edges of the flange indicated at 28 extend down toward the rear of the blade portion of the sweep to a rear edge 29 of the blade, which rear edge lies in a plane higher than the cutting edge to provide an upper surface of the blade which extends generally upwardly and rearwardly from the cutting edge 26 back toward the rear edge 29.

The wings are therefore slightly curved upwardly and rearwardly from the front edge 262 to the rear edge 29 to increase suction behind the sweep and to assist in throwing cut weeds upwardly to the surface.

The rear edge 29 includes a first portion 291 parallel to the front edge 262, and a second portion 292 extending forwardly and inwardly therefrom to the base of the flange 23. The portion 292 is substantially parallel to the edge 261 and is spaced therefrom by a distance substantially equal to the spacing between the edges 262 and 291. In this way, wear occurring on the edges 26 and 262 tends to eat into the body of the sweep to approach the edges 291, 292 respectively at the same time so that the sweep is fully worn when little material is left at the edges 291, 292.

As shown in best detail in FIG. 1, the edges 26, 27 include a first portion which is substantially straight and extends rearwardly and outwardly from the point 25 and indicated at 261, and a second portion 262 which lies at an angle to the first portion and projects generally directly outwardly from or at right angles to a central axis passing through the point 25. The change of direction between the two portions 261, 262, is substantially immediate so that any weeds running back along the edge 261 contact the edge 262 and are cut by that edge rather than tending to curve away past the outermost portion of the edge 262. The edges 262 and 272 are shown in FIG. 1 as lying at right angles to the axis 30 but it will be apparent that this direction can be modified provided that there is a change of direction from the portion 261 so as to extend more sharply outwardly so that weeds contact the edges 262 and 272.

The edges 262, 272 thus effectively form wings which are additional to the conventional accepted form of the sweep shown in FIG. 3. These additional wings provide additional material adjacent the outermost edges of the sweep so that wear does not initially cause a reduction in the working width of the sweep but tends merely to curve the outer point indicated at 263 of the edge 262 and the rear point 264 of the outer straight edge 265 of the wing portion. This straight edge 265 is different from the conventional sweep and lies generally parallel to the direction and motion of the sweep whereas the outermost portion of the conventional sweep comprises merely a point indicated at 14, 15 where the edge turns immediately back toward the axis.

In one example, the length of the edge 265 is of the order of three inches and the rear end thereof is ¾ inch higher than the front end thereof giving an inclination of the order of 20°. The length of the edges 262 and 272 is of the order of ⅜ inch and this dimension can be used in sweeps of different overall size.

The method of attachment using a flange with two holes can be modified in accordance with the requirements to accommodate conventional variations in the shank 21. The sweep can be effectively planar if required, whereby the center line 24 lies in the same plane as the edges 26 and 27.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A ground working sweep comprising a metal body having means for attachment of the body to a support tine whereby the sweep can be drawn through the earth, said body including a sweep portion having a cutting edge projected forwardly from the tine for engaging the earth as the sweep is moved through the earth, the cutting edge having a forwardmost central point and two side edges which extend from the point and each of which includes a first substantially straight portion inclined sidewardly and rearwardly away from the point relative to a longitudinal axis central to the sweep and a pair of wing portions, each wing portion extending outwardly to a respective side of the sweep portion and defining a second substantially straight portion of the cutting edge contiguous with the first and substantially at right angles to the longitudinal axis, an outermost side edge of each wing portion extending parallel to the longitudinal axis, and each wing portion having a trailing edge inclined upwardly from the second portion of the cutting edge relative to a trailing edge of the sweep portion to assist in throwing out weeds upwardly to the ground surface, the spacing between the trailing edge of the wing portion and the second cutting edge portion being substantially equal to the spacing between the trailing edge of the sweep portion and the first cutting edge portion.

2. A sweep according to claim 1 formed as a unitary integral body.

3. A sweep according to claim 1 wherein the trailing edge of the wing portion is substantially parallel to said second cutting edge portion and the trailing edge of the sweep portion is inclined inwardly and forwardly so as to lie substantially parallel to said first cutting edge portion.

* * * * *